(12) United States Patent
Pujol et al.

(10) Patent No.: US 7,024,854 B2
(45) Date of Patent: Apr. 11, 2006

(54) MASTER CYLINDER WITH INCREASED SAFETY AND PISTON FOR SUCH A MASTER CYLINDER

(75) Inventors: Hervé Pujol, Le Pre St Gervais (FR); Serge Aquino, Rosny Sous Bois (FR); Marc Noblet, Paris (FR); Chris Anderson, Paris (FR); Thierry Fausten, Tremblay en France (FR)

(73) Assignee: Robert Bosch GmbH, Stuttgart (DE)

( * ) Notice: Subject to any disclaimer, the term of this patent is extended or adjusted under 35 U.S.C. 154(b) by 10 days.

(21) Appl. No.: 10/942,259

(22) Filed: Sep. 16, 2004

(65) Prior Publication Data

US 2005/0060997 A1 Mar. 24, 2005

(30) Foreign Application Priority Data

Sep. 23, 2003 (FR) .................................. 03 11167

(51) Int. Cl.
*F15B 7/08* (2006.01)
(52) U.S. Cl. ..................................... 60/589
(58) Field of Classification Search ................. 60/562, 60/589
See application file for complete search history.

(56) References Cited

U.S. PATENT DOCUMENTS

| | | | | |
|---|---|---|---|---|
| 2,704,585 A | * | 3/1955 | Stromberg ................... | 60/562 |
| 4,706,459 A | * | 11/1987 | Burckhardt .................. | 60/589 |
| 4,939,901 A | * | 7/1990 | Saalbach et al. .............. | 60/589 |
| 4,941,322 A | * | 7/1990 | Nomura et al. ............... | 60/589 |
| 5,477,681 A | * | 12/1995 | Tackett ........................ | 60/589 |
| 6,434,931 B1 | * | 8/2002 | Shaw et al. ................... | 60/589 |

* cited by examiner

*Primary Examiner*—Edward K. Look
*Assistant Examiner*—Michael Leslie
(74) *Attorney, Agent, or Firm*—Leo H. McCormick, Jr.; Warren Comstock

(57) ABSTRACT

A master cylinder with increased safety having a piston produced by molding a plastic or aluminum alloy. The piston slides in a bore blocked off by an end wall. A valve for the master cylinder bears at rest against a pin that is fixedly mounted in the body of the master cylinder passes through the piston via a longitudinal slot. The dimensions of the master cylinder are determined such that the piston bears against the pin before coming into contact with the end wall of the master cylinder body.

9 Claims, 2 Drawing Sheets

MASTER CYLINDER WITH INCREASED SAFETY AND PISTON FOR SUCH A MASTER CYLINDER

The present invention relates primarily to a master cylinder with increased safety and to a piston for such a master cylinder, in particular a master cylinder comprising a piston produced by molding a plastic or aluminum, for example.

BACKGROUND OF THE INVENTION

Document FR 02 817190 describes a master cylinder for a braking system comprising pistons made of plastic material and produced by molding. Each of the pistons divides a first and a second hydraulic circuit into a supply chamber and a pressure chamber, the pressure chamber being in communication with the supply chamber at rest through a duct made in the piston and blocked off by a shutter during a braking action.

The shutter and the duct form a valve, said valve being actuated by the displacement of the piston caused by an effort applied to the brake pedal. The supply chamber is connected to a brake fluid reservoir and the pressure chamber is connected to brakes arranged at the wheels of the motor vehicle. The valve is open in the rest position by means of a bearing element against which the shutter bears and is then lifted from a valve seat formed around the duct. In the primary circuit, the bearing element is a floating pin which is displaced with the movement of the piston. By contrast, in the secondary hydraulic circuit, the pin is fixed and mounted in the body of the master cylinder.

During a maximum travel of the secondary piston, its front end, that is to say its end directed away from the brake pedal, bears against the end wall of the master cylinder body. It has been observed that the action of the front end of the secondary piston bearing against the end wall of the master cylinder body can cause damage to the front end of the secondary piston, which is detrimental to reliable operation of the master cylinder.

Specifically, the plastic material used for the production by molding of the secondary piston in particular is not able to withstand repeated impacts. However, the economic advantage it provides on account of the simplicity of production of the piston by molding and on account of the weight saving provided thereby for the whole master cylinder, and therefore for the whole braking system, is very considerable. It is consequently desirable to be able to continue to use pistons made of plastic material in the master cylinders.

It would be conceivable to produce plastic pistons capable of withstanding the repeated impact against the body of the master cylinder by employing plastic materials of high mechanical strength. However, these plastic materials have a relatively high cost price and are much more difficult to use, which would cancel out a large part of the advantageous effect gained from employing the plastic material to produce the pistons of the master cylinder.

SUMMARY OF THE INVENTION

It is consequently an object of the present invention to offer a master cylinder comprising plastic pistons with increased safety.

It is also an object of the present invention to offer a master cylinder comprising plastic pistons having a service life equal to the service lives of master cylinders comprising standard pistons.

It is also an object of the present invention to offer a master cylinder comprising pistons made of plastic of low cost price.

These objects are achieved by a master cylinder for a braking system comprising a primary circuit and a secondary circuit which are respectively provided with a primary piston and with a secondary piston, each of the pistons defining a supply chamber and a working chamber which are brought into communication at rest by a valve arranged in each of the pistons, the valves being open at rest by means of pins arranged in the body of the master cylinder, the pin of the primary circuit being mounted in a floating manner in the primary piston and the pin of the secondary circuit being fixedly mounted in the body of the master cylinder, the pin of the secondary circuit being mounted in a longitudinal slot made in the secondary piston, the slot being dimensioned such that it prevents the front end of the secondary piston from coming into contact with the end wall -of the master cylinder body.

In other words, the secondary piston bears against the pin of the secondary circuit before butting against the end wall of the master cylinder.

Increasingly large numbers of motor vehicles are equipped with electronic stability control systems allowing better control over the course taken by the motor vehicle. This system employs a computer which receives information from various sensors, the computer determining from this information whether or not it is necessary to correct the course of the vehicle. Should the course need to be modified, the computer orders a hydraulic pump to send brake fluid to the brakes in order to bring about braking of one or more wheels, the brake fluid being drawn from the brake fluid reservoir through the master cylinder. However, because of the high flow rates required for the operation of these electronic stability control systems, it is necessary to have large passage sections across the master cylinder and in particular in the pistons, in particular in the secondary piston, one of the characteristic sections being the section defined by the slot in which the pin is slideably mounted.

Consequently, it is advantageous to provide a slot having the largest possible dimensions; however, in order to achieve the highest possible impact resistance for the piston owing to the contact between the rear end of the slot and the pin, it is also necessary to provide a particular shape of the slot in order to optimally distribute the forces applied by the pin against the piston. This objective is achieved by a slot having a first, rear part whose transverse dimensions are substantially equal to the diameter of the pin so that the latter bears over the whole rear periphery of the slot and also comprising a second, front part whose transverse dimensions are sufficient to allow the passage of the brake fluid from the reservoir to the brake when said brake fluid is drawn by a hydraulic pump.

The present invention has the advantage of being of very simple design, of being easy to apply to any type of master cylinder having pistons with valves, and of being able to be used on vehicles comprising electronic stability control systems.

The Subject of the present invention is primarily a master cylinder comprising a body in which is made a bore blocked off at one end by an end wall, at least one piston slideably mounted in a sealed manner in the bore, a hydraulic fluid supply chamber formed in a longitudinal slot in the piston, a working chamber connected to brakes, said working chamber being connected to the supply chamber through a passage made in the piston, a valve intended to block off said passage during a braking phase, said valve comprising a shutter and a valve seat borne by the piston, said shutter bearing at rest against a bearing element fixedly mounted in the body of the master cylinder, said bearing element being mounted to pass through the longitudinal slot, characterized in that the distance separating a first end of the slot remote from the valve and a first end of the bearing element remote from the end wall is less than a distance separating a first end of the piston close to the end wall and the end wall.

Another subject of the present invention is a master cylinder characterized in that the bearing element is a pin.

Another subject of the present invention is a master cylinder characterized in that the first end of the slot is in the form of a circular arc and in that the circular arc has a diameter which is substantially equal to the diameter of the pin so as to achieve uniform distribution of the stresses applied by the pin to the piston.

Another subject of the present invention is a master cylinder characterized in that a second end of the slot close to the end wall has a width which is greater than the diameter of the first end of the slot.

Another subject of the present invention is a master cylinder characterized in that said piston is obtained by molding.

Another subject of the present invention is a master cylinder characterized in that the piston is produced by molding plastic.

Another subject of the present invention is a master cylinder characterized in that the piston is produced by molding phenolic material.

Another subject of the present invention is a master cylinder characterized in that the piston is produced by molding an aluminum alloy.

Another subject of the present invention is a master cylinder characterized in that the shutter is brought into contact with the valve seat by means of a spring mounted in compression in a housing into which opens the passage between the shutter and a cap force-fitted in the housing.

Another subject of the present invention is a master cylinder characterized in that the master cylinder is a tandem master cylinder comprising a primary piston and a secondary piston.

Another subject of the present invention is a master cylinder characterized in that it comprises primary and secondary return springs belonging respectively to the primary and secondary pistons, and in that the primary spring is mounted in a cage determining the load of the spring, said cage bearing against the primary piston and the secondary piston.

A further subject of the present invention is a piston for a master cylinder comprising a longitudinal slot intended to receive a bearing element passing through the piston, characterized in that the slot comprises a bearing end which is able to come into contact with the bearing element.

The present invention will be better understood with the aid of the description which follows and the appended figures in which the front and rear correspond respectively to the left-hand part and right-hand part of the drawings.

DETAILED DESCRIPTION OF THE INVENTION

By rest position is meant the position occupied by the pistons of the master cylinder when no braking effort is applied to the brake pedal.

Figure 1:
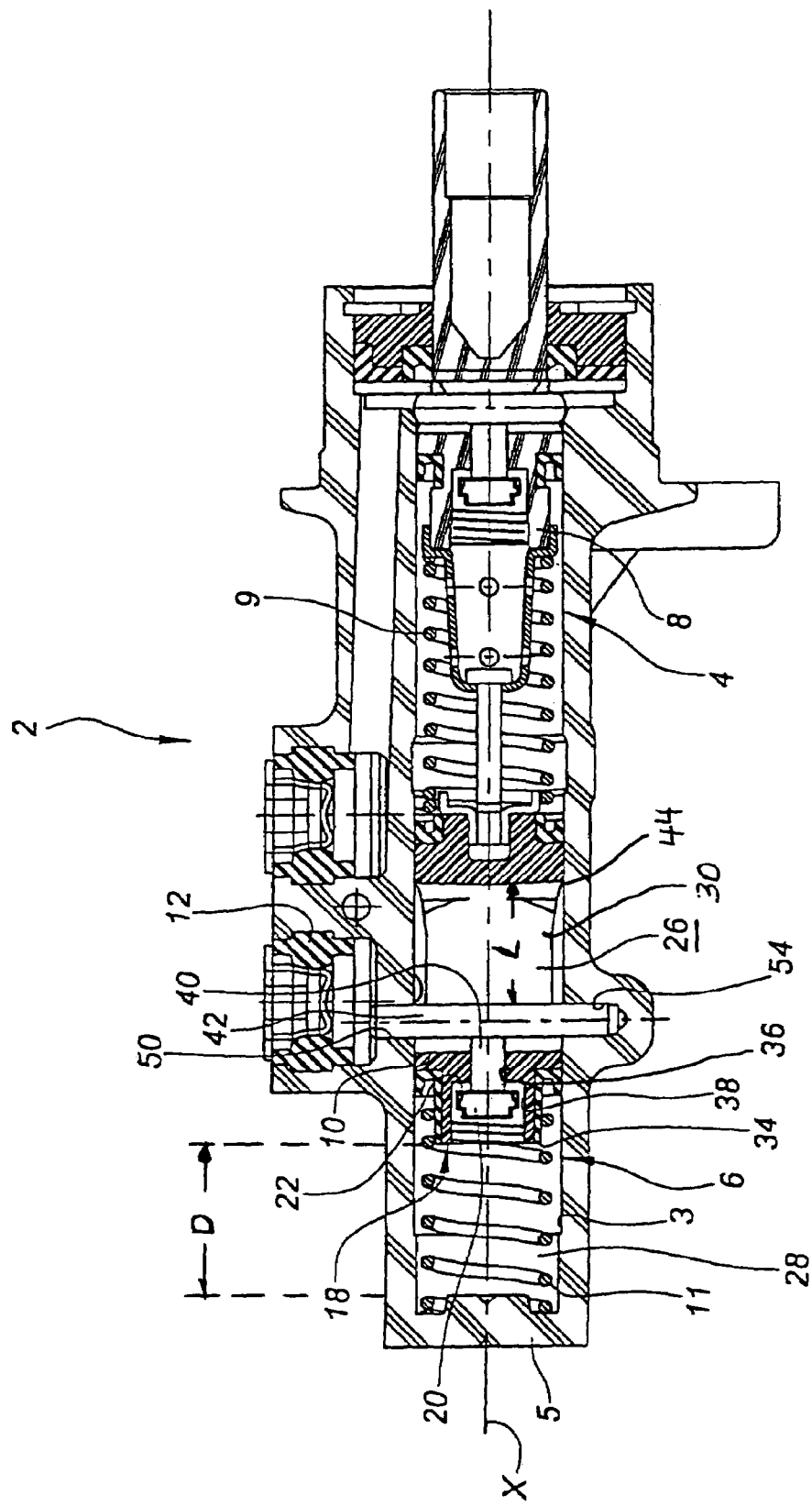
FIG. 1 is a view in longitudinal section of a master cylinder according to the present invention in the rest position.

FIG. 1 shows a master cylinder according to the present invention comprising a master cylinder body 2 of longitudinal axis X in which is made a bore coaxial to the axis X, said bore 3 being blocked off at one end by an end wall 5. It is of course possible to provide a through bore 3 blocked off at a longitudinal end by an attached plug mounted, for example, by screwing or by adhesive bonding. Slideably mounted with sealing in the bore 3 are a primary piston 8 and a secondary piston 10 respectively defining a primary hydraulic circuit 4 and a secondary hydraulic circuit 6.

The master cylinder is controlled by a brake pedal actuated by a driver from a passenger compartment of a motor vehicle by way of a control rod. A pneumatic brake booster is commonly interposed between the brake pedal and the master cylinder and transmits the braking effort and boost force to the primary piston by a push rod which penetrates a rear end of the primary piston.

The primary and secondary pistons are respectively returned to the rest position by a primary and secondary return spring 9, 11. The primary return spring is mounted between a rear end of the secondary piston 10 and a front end of the primary piston 8. Advantageously, the primary return spring is mounted in a cage of variable longitudinal dimension having a predetermined maximum dimension, the cage establishing the load of the primary piston return spring. The cage is mounted to bear against the primary and secondary pistons.

Since the present invention advantageously applies to the secondary circuit, we will describe only the secondary hydraulic circuit; however, it goes without saying that the present invention can be applied to the primary piston.

The secondary hydraulic circuit 6 comprises a supply chamber 26 connected by sealed means 12 to a brake fluid reservoir (not shown) and a pressure chamber 28 connected to brakes arranged at the wheels of the motor vehicle. The supply chamber 26 is delimited by a longitudinal slot 30 made in the body of the piston 10, and the pressure chamber 28 is delimited by a front longitudinal end 34 of the secondary piston and the end wall 5. The supply chamber is in communication with the working chamber via a passage 36 made in the piston 10 and blocked off by a valve 18 during a braking application. The valve 18 for its part comprises a valve seat 20 borne by the piston and a shutter 22 returned elastically against the valve seat by a spring 38. The shutter 22 bears by way of a rod 40 against a bearing element 42 which is fixedly mounted in the body of the master cylinder and passes through the slot 32. The bearing element 42 is for example a cylindrical pin having an axis perpendicular to the axis X of the master cylinder body and extending from the lower part of the master cylinder body toward the upper part of the master cylinder body.

The spring 38 is advantageously retained in a housing 37, which is made in the piston and into which the passage 36 opens, by means of a cap force-fitted at a front end of the housing 37. The cap is perforated so as to allow brake fluid to flow from the supply chamber to the working chamber.

During a braking action, the primary piston slides in the body of the master cylinder in the direction of the arrow F, causing the secondary piston 10 to slide in the direction of the arrow F, the rod of the shutter 22 loses contact with the pin 42, the shutter 22 is pushed back by the spring 38 in the direction of the valve seat, and the valve closes, blocking off communication between the supply chamber 26 and the pressure chamber 28 and thus allowing a rise in pressure in the pressure chamber 28 and in the brakes arranged at the wheels. The braking level increases with the displacement of the primary and secondary pistons in the direction of the arrow and the maximum braking level is reached when the secondary piston comes into contact with the front end of the bore 3 in the master cylinder body.

The secondary piston is advantageously produced by molding plastic for example, for example a phenolic material, or aluminum alloy in such a way that it does not have a parting line requiring machining or deburring. The molding of the piston is advantageously carried out for example with a three-part mold, a first part for the main body of cylindrical shape, a second part and a third part for forming the front and rear ends of the pistons, and a two-part slide for producing the slot. However, contact with the end wall 5 of the bore 3 in the master cylinder may damage the front end 34 of the secondary piston and give rise for example to the appearance of plastic material debris or chips, which are liable to disrupt the sliding of the piston, in particular the sealed sliding of the piston, and therefore the rise in pressure in the pressure chamber 28.

The present invention makes it possible to solve this problem.

According to the present invention, the distance L separating a rear end 44 of the slot 30 and a rear end 46 of the pin 42 is less than the distance D separating the front end 32 of the secondary piston from the end wall 5 of the bore 3. Consequently, the maximum travel of the secondary piston 10 is limited by the contact between the rear end 44 of the slot 30 with the rear end 46 of the pin 42 and not by the contact between the front end 32 of the secondary piston and the end wall 5 of the bore 3.

The slot 30 advantageously comprises a first, rear longitudinal part 48 of smaller transverse dimension and a second, front longitudinal part 50 of larger transverse dimension. The first part 48 and the second part 50 are artificially delimited in FIG. 2 by a chain line. In the sectional view of the secondary piston represented in FIG. 2, the first part 48 comprises a first, rear longitudinal end delimited by a circular arc 52 with a diameter substantially equal to the diameter of the pin 42, and extending toward a second, front longitudinal end by a rearwardly pointing truncated cone. The second, front longitudinal part 50 comprises a first substantially rectangular section having a transverse dimension d which is greater than the diameter of the pin 42 and is terminated toward the front in the example represented by a circular arc.

Figure 2:
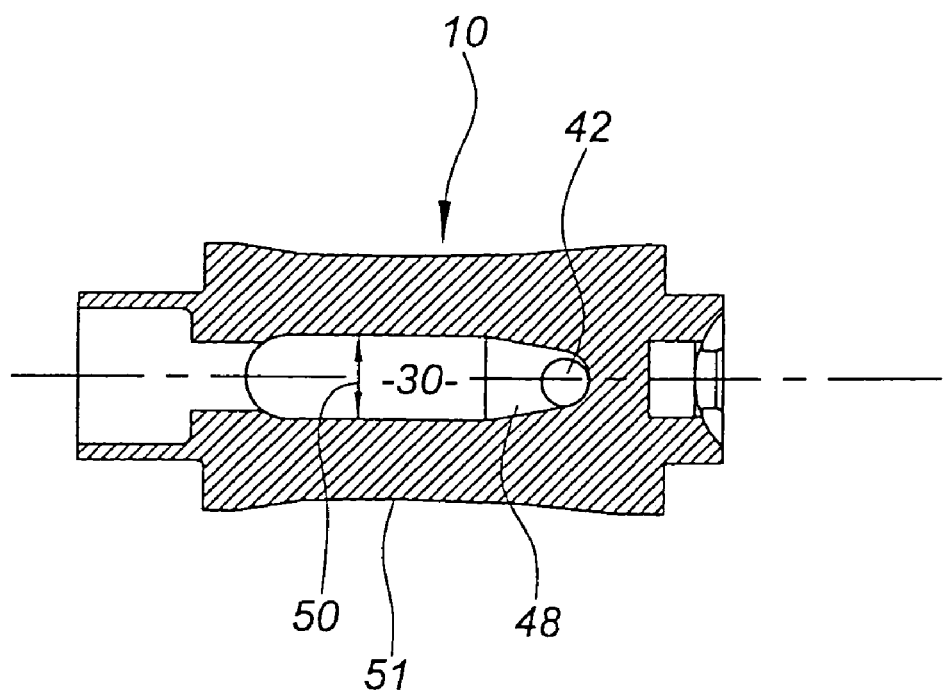
FIG. 2 is a view in longitudinal section of a master cylinder piston according to the present invention.
Figure 3:
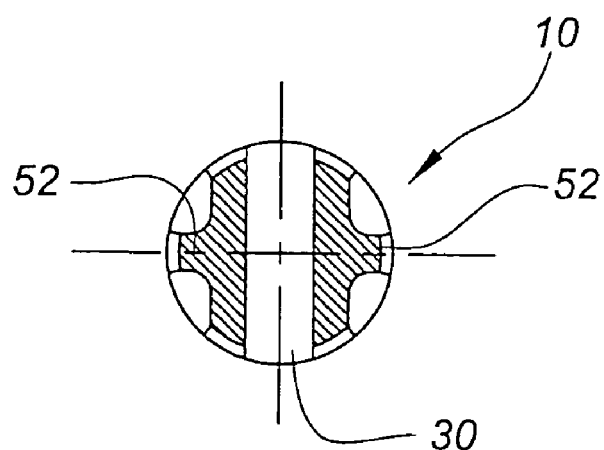
FIG. 3 is a view in cross section of a piston according to the present invention.

FIG. 2 shows in chain lines the pin 42 in an end position when the secondary piston has completed its maximum travel. It can thus be seen that the rear end 44 of the slot 30 and the rear periphery of the pin 42 are in close contact and allow the forces applied to the piston 10 by the pin 42 to be distributed uniformly, avoiding a concentration of stresses at particular points on the piston which risk damaging the latter.

Provision is also made to use a bearing element whose rigidity is greater than that of a bearing element used in master cylinders whose secondary piston bears against the end wall of the master cylinder body. For example, in the case of a pin, its diameter is larger than the diameter of a pin used in a conventional master cylinder.

The piston advantageously comprises a periphery which is profiled in such a way as to increase the flow rate of drawn fluid in the ESP activation phase. For example, the piston comprises a narrowing 51 situated at the central part in the axial direction so as to increase the passage section between the piston and the bore 3, and axial grooves 52 to stiffen the piston.

A master cylinder with increased safety has been satisfactorily produced with a relatively small cost price and a low weight and it can be adapted to the braking system comprising electronic stability control systems.

The present invention applies especially to the motor industry.

The present invention applies primarily to the motor vehicle brake industry and especially to the brake industry for private cars.

We claim:

1. A master cylinder comprising a body (2) in which is made a bore (3) blocked off at one end by an end wall (5), at least one piston (8, 10) slideably mounted in a sealed manner in the bore, a hydraulic fluid supply chamber formed in a longitudinal slot (30) in the piston, a working chamber connected to brakes, said working chamber being connected to the supply chamber through a passage (36) made in the piston (8, 10), a valve for blocking off said passage (36) during a braking phase, said valve (18) comprising a shutter (22) and a valve seat (20) borne by the piston (8, 10), said shutter (22) bearing at rest against a bearing element (42) fixedly mounted in the body (3) of the master cylinder, said bearing element being mounted to pass through the longitudinal slot (30), a distance (L) separating a first end (44) of the slot remote from the valve (20) and a first end (46) of the bearing element remote from the end wall (5) being less than a distance (D) separating a first end (34) of the piston close to the end wall (5) and the end wall (5), the bearing element being a pin, characterized in that the first end (44) of the slot (30) is in the form of a circular arc and in that the circular arc has a diameter which is substantially equal to the diameter of the pin so as to achieve uniform distribution of the stresses applied by the pin to the piston (8, 10).

2. The master cylinder according to the claim 1, characterized in that a second end of the slot (30) close to the end wall (5) has a width which is greater than the diameter of the first end (44) of the slot (30).

3. The master cylinder according to claim 1, characterized in that said piston is obtained by molding.

4. The master cylinder according to the claim 3, characterized in that the piston is produced by molding plastic.

5. The master cylinder according to the claim 4, characterized in that the piston is produced by molding phenolic material.

6. The master cylinder according to claim 3, characterized in that the piston is produced by molding an aluminum alloy.

7. The master cylinder according to claim 1, characterized in that the shutter (22) is brought into contact with the valve seat (20) by means of a spring (38) mounted in compression in a housing into which opens the passage (36) between the shutter and a cap force-fitted in the housing.

8. The master cylinder according to claim 1, characterized in that the master cylinder is a tandem master cylinder comprising a primary piston and a secondary piston.

9. The master cylinder according to claim 8, characterized by primary (9) and secondary (11) return springs respectively associated with the primary and secondary pistons, and in that the primary spring is mounted in a cage determining the load of the spring, said cage bearing against the primary piston and the secondary piston.

* * * * *